H. D. ALBERT.
SAFETY WEIGHING ATTACHMENT FOR ELEVATORS.
APPLICATION FILED DEC. 18, 1917.
1,284,960.
Patented Nov. 19, 1918.
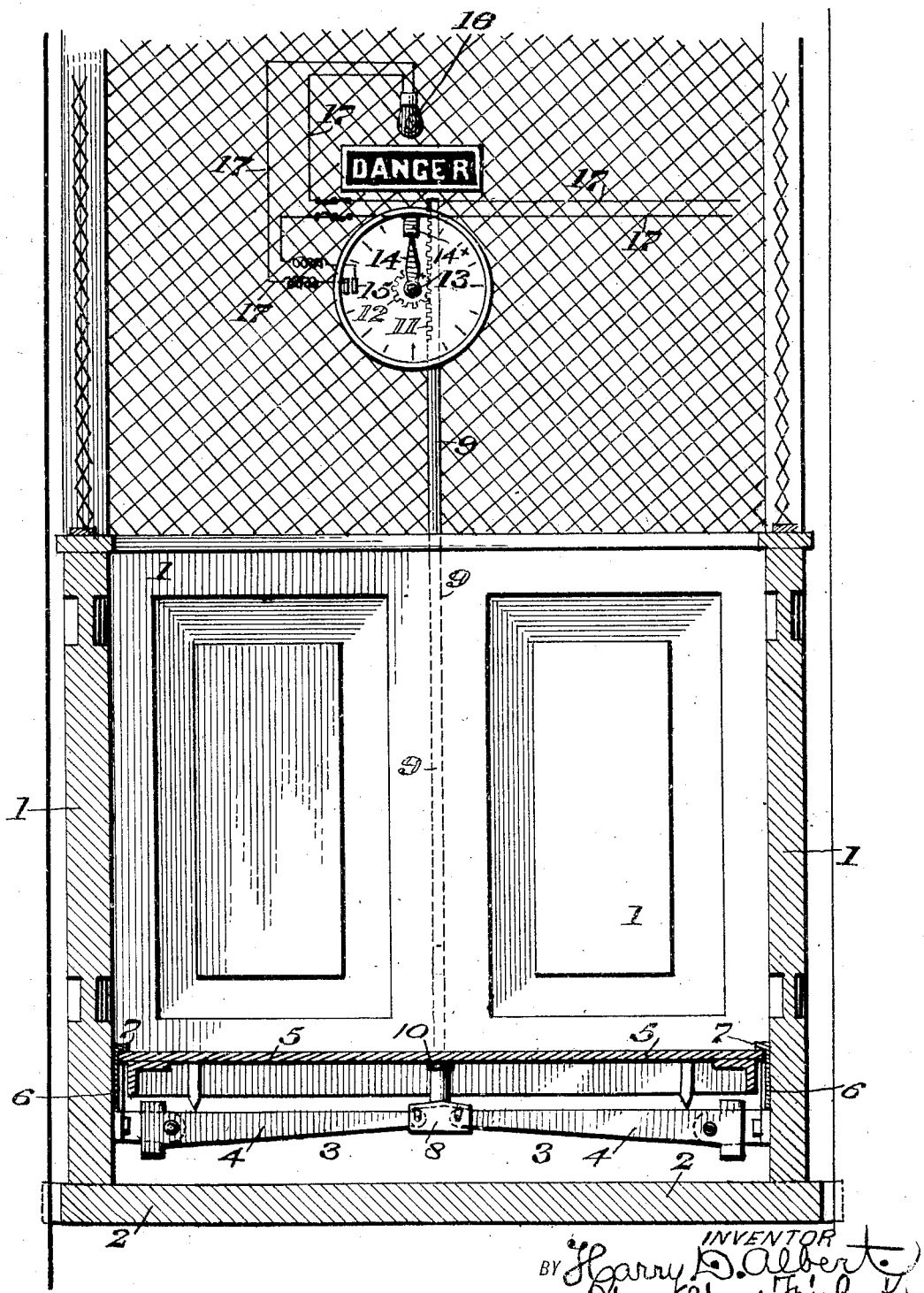

UNITED STATES PATENT OFFICE.

HARRY D. ALBERT, OF PHILADELPHIA, PENNSYLVANIA.

SAFETY WEIGHING ATTACHMENT FOR ELEVATORS.

1,284,960.  Specification of Letters Patent.  Patented Nov. 19, 1918.

Application filed December 18, 1917. Serial No. 207,740.

*To all whom it may concern:*

Be it known that I, HARRY D. ALBERT, a citizen of the United States, residing in the city and county of Philadelphia, State of Pennsylvania, have invented a new and useful Safety Weighing Attachment for Elevators, of which the following is a specification.

My invention consists of an elevator having a weighing attachment to the car thereof, and of a danger signal to indicate an overloaded condition of the car. To this end the floor of the car is of the order of the platform of a scale, the same being superimposed on organized scale lever members so that weight on said platform will operate said members and transmit motion to an index finger or hand of a dial, which finger or hand is adapted to form an electric circuit with a danger signal which will be illuminated at a predetermined weight when a safe condition of the loaded car has passed, thus notifying the operator of the elevator of the danger and the requirement of reducing the load.

The invention is satisfactorily illustrated in the accompanying drawing, but the important instrumentalities thereof may be varied, and so it is to be understood that the invention is not limited to the specific details shown and described, as long as they are within the spirit or scope of the claims.

The figure represents a partial front elevation, and a partial vertical section of a safety attachment for an elevator embodying my invention.

Referring to the drawings, 1 designates a portion of the car of an elevator which excepting the feature of my invention applied thereto is of usual nature.

Above the base of the car 1 is the weighing-scale mechanism 3 of approved form, the levers 4 thereof mounted on the car have imposed on them the supplemental floor 5 of the car, said supplemental floor comprising the movable platform of the weighing-scale mechanism, said platform being vertically movable as usual in platform scales.

The sides of the scale platform are freely fitted in the vertical channeled pieces 6 which are secured to the side walls of the car 1 and serve to guide the scale platform in its lowering and returning motions, and owing to the inturned flanges 7 on the tops of said pieces 6 to limit the ascent of said platform. Seated on the coupling 8 of the levers 4 is the lower end of a rod or bar 9 which passes freely upwardly therefrom at the back of or through another proper portion of the car to an upper part of the latter where its top portion is provided with the rack 11, with which meshes the pinion 12 to whose shaft 13 is connected the index finger or hand 14 which is provided with a suitable point 14× of copper or other material adapted to sweep over a graduated dial which with said shaft 13 are mounted in the present case on said upper part of the car.

The coupling 8 of the beams 4 of the weighing scale mechanism will be seated on a spring of predetermined power as the counterpoise of the scale mechanism, and consequently of the movable platform.

On the rack bar 9 below the scale platform 5 is the collar or shoulder member 10 which may be of the form of a sleeve or an arm fitted on and secured to the lower end portion of said bar and being seated on the coupling 8 of the levers 4 of the scale mechanism, it being noticed that while the platform 5 is imposed on said levers it is also seated on the collar or shoulder member 10, whereby as said platform descends when loaded, it draws down said bar and causes an operation of the scale mechanism and a consequent weighing of the load as indicated on the dial.

On the peripheral portion of said dial are the contact points 15 of copper or other suitable material adapted to be engaged at a certain time by the point of the index finger or hand 14, as will be hereinafter more fully described.

On the car in the present case on the upper part thereof is the electric lamp or light 16 and also the conductors 17, which are connected respectively with the said light 16 and the contact points 15, and extend from a battery, not shown, whereby said points and light are in an electric circuit.

It will be understood that the elevator is capable to carry a load of a predetermined weight, and if it exceeds the latter it will be dangerous. Now as the load is imposed on the car the platform 5 will descend, and with it the shoulder member, the levers of the weighing mechanism are operated and the rack bar being carried down by the platform subject to said weighing mechanism, whereby the index finger or hand is operated indicating on the dial the extent of the load on the car. Should said finger pass the "safety" graduation on the dial, whatever that may be, as determined upon, said finger will contact with the points 15 whereby a circuit is formed with the electric lamp 16 and the latter will be illuminated indicating by its color the danger of the situation, when the elevator attendant will know that the load must be reduced, otherwise if the elevator is operated it may break down or run away.

When the predetermined load is reëstablished, or about reëstablished, as the index finger will show, and the light extinguished, the elevator may be operated without danger as far as the load is concerned.

When the car is emptied the platform and weighing mechanism and index finger return to their normal position.

Having thus described my invention what I claim as new and desire to secure by Letters Patent, is:—

1. A weight-safety attachment for the car of an elevator, comprising an elevator car the scale levers supporting the platform and a scale platform supported thereby, a vertical member seated on the levers of the scale and movable upon the descent of the platform, a graduated member, a movable index finger coöperating therewith, and means including said vertical member whereby said finger is actuated by the depression of the platform and the actuation of said levers.

2. A weight-safety attachment for the car of an elevator, comprising an elevator car the scale levers supporting the platform and a scale platform supported thereby, a vertical member seated on the levers of the scale and movable upon the descent of the platform, a graduated member, a movable index finger coöperating therewith, means including said vertical member whereby said finger is actuated by the depression of the platform, and electrical means with a visual indicator operatively related to said finger to notify the elevator attendant when the car is overloaded.

3. A weight safety attachment for the car of an elevator comprising an elevator car, a movable platform therein, coupled levers of a weighing mechanism interposed between said platform and the floor proper of the car, said platform being imposed on said levers, a graduated dial on the car, a movable index finger mounted on said dial, a collar mounted on the coupling of the levers of the scale mechanism, and a connection for said collar with the axis of said index finger, said connection being movable upon the descent of the platform.

4. A weight safety attachment for the car of an elevator comprising an elevator car, a movable platform therein, levers of a weighing mechanism interposed between said platform and the floor proper of the car, said platform being interposed on said levers, a graduated dial on the car, a movable index finger mounted on said dial, a connection for said levers with the axis of said index finger, and movable with the weighing mechanism, contacts on said dial, a signal, and means for forming an electric circuit for said index finger with said contacts and for the latter with said signal.

HARRY D. ALBERT.

Witnesses:
JOHN A. WIEDERSHEIM,
N. BUSSINGER.